(12) United States Patent
Thomas

(10) Patent No.: US 6,892,493 B1
(45) Date of Patent: May 17, 2005

(54) APPARATUS FOR GROWING A PLANT

(76) Inventor: Stanley S. Thomas, 375 River Run Rd., Quitman, GA (US) 31643

( * ) Notice: Subject to any disclaimer, the term of this patent is extended or adjusted under 35 U.S.C. 154(b) by 68 days.

(21) Appl. No.: 10/412,851

(22) Filed: Apr. 14, 2003

(51) Int. Cl.[7] ............................................. A01G 31/02
(52) U.S. Cl. .................. 47/63; 47/87; 47/47
(58) Field of Search ................ 47/1.01 R, 59,
47/60, 62 R, 62 C, 62 E, 62 N, 63, 64, 65.5,
47/66.6, 66.7, 68, 79, 86, 87–40.5, 41.01–41.54,
47/58.1; 111/108

(56) References Cited

U.S. PATENT DOCUMENTS 4,035,950 A * 7/1977 Anselm ...................... 47/59 R
4,399,634 A * 8/1983 O'Hare ....................... 47/59 R

* cited by examiner

Primary Examiner—Christopher J. Novosad

(57) ABSTRACT

An apparatus for growing a plant is disclosed. A planting system is also disclosed.

20 Claims, 3 Drawing Sheets

APPARATUS FOR GROWING A PLANT

FIELD OF THE INVENTION

The present invention is directed to an apparatus for growing a plant and a method of using the same.

BACKGROUND OF THE INVENTION

Growing tomato plants, as well as other types of fruit or vegetable plants, often requires that the plant be stabilized while it grows in order to keep the fruit or vegetables off the ground. Traditionally, this is done by tying the plant to a stake, tying the plant to a trellis system, or by placing a cage around the plant to provide support while it grows. Despite the support that these systems provide for the plant, they are inflexible in that they fail to allow the grower to alter conditions under which the plant grows, they often require lots of time and energy that many amateur growers are unlikely to spend, and do not provide for a method to ensure efficient watering.

With the techniques described above, a grower typically plants in a permanent location with the plants spaced a predetermined distance from each other. If the conditions of the location change such that it becomes difficult to maximize plant health and fruit or vegetable output, it is difficult for the grower to relocate the plants. For example, an amateur grower might find that the chosen location for the garden has inadequate or too much lighting, an unexpected freeze may threaten the plants, or there is inadequate space between plants. In any of these situations, the grower either loses the plants or the plants must be relocated. To relocate the plants, a grower must first untie the plants from the stake or trellis system or remove the cages. Next, the grower must dig up the plants and replant them in a suitable location. Finally, the grower must again install a support system of choice.

Additionally, many amateur growers rely on watering fruit or vegetable plants using conventional sprinkler devices. A problem with conventional sprinkler devices is that they do not concentrate the water on the roots of the plants. The result is inefficiency that leads to wasting water that is sprayed around the plant. Stakes, trellis systems, and cages are strictly used for support and do not provide for efficient watering means. Therefore, in light of the above, there is need in the art for an apparatus that allows a grower to support fruit or vegetable plants while allowing for the ability to relocate the plants and means for increased watering efficiency.

SUMMARY OF THE INVENTION

The present invention addresses the above-mentioned problems in the art by providing an apparatus for growing a plant, such as a fruit or vegetable plant. The apparatus allows for plant support, simple and efficient plant feeding, and portability. One exemplary embodiment of the present invention comprises a planting conduit that may be buried in the ground and filled with dirt, compost, or any appropriate growing medium. A feeder conduit is connected to the planting conduit such that the feeder conduit extends from the ground and may be used to support the plant when the plant grows to an appropriate height to be tied to the feeder conduit. The feeder conduit is also used to provide water or other food to the plant. By watering the plant using the feeder conduit, a grower does not have to bend down to manually water the plant at its base and is assured that the water is going directly to the plant roots since the feeder conduit connects directly to the planting conduit where the plant roots are contained.

An opening exists in the apparatus so that the plant exits the apparatus and grows externally where it may be exposed to sunlight. In one exemplary embodiment of the present invention, a "y" shaped coupling is used to connect the feeder conduit and the planting conduit. The feeder conduit and planting conduit are connected to opposing openings of the y-shaped coupling so that the plant may grow through a third opening.

The present invention is also directed to a method of growing a plant. In one exemplary embodiment, a grower places a planting conduit below ground level and fills it with soil, compost, or any appropriate growing medium. Next, the grower buries a seed or the roots of a plant in the planting conduit. A coupling is connected to the planting conduit to decrease the opening of the planting conduit to the size of the opening of a fitting that contains multiple openings. A fitting with at least three openings, wherein at least two of the openings are opposed to one another, is connected to the coupling. A seed or plant is fed down a side opening of the fitting and the coupling and fitting are filled with soil to cover any plant roots. A feeder conduit is connected to an opening on the fitting that is opposed to the opening that is connected to the coupling. Some extra soil may be added to ensure root coverage since the soil will compact once watering begins. The grower may water the plant regularly through the feeder conduit. Once the plant has grown to sufficient height, it may be tied to the feeder conduit to prevent the fruit or vegetables from resting on the ground. In one exemplary embodiment, the feeder conduit, fitting, coupling, and planting conduit may disconnect from each other to provide compact storage when not in use.

The present invention is also directed to a planting system comprising an apparatus for growing a plant comprising a feeder conduit, a planting conduit integrally connected to the feeder conduit, an opening proximate a junction between the feeder conduit and the planting conduit, and a seed or plant portion positioned within the planting conduit.

These and other features and advantages of the present invention will become apparent after a review of the following detailed description of the disclosed embodiments and the appended claims.

DETAILED DESCRIPTION OF THE INVENTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

I. Plant Growing Apparatus

The apparatus for growing, watering, and stabilizing fruit or vegetable plants of the present invention may be described with reference to FIGS. 1–5. However, it should be noted that the embodiments described with reference to FIGS. 1–5 are exemplary embodiments of the present invention, and should not be interpreted to limit the present invention in any way.

A. Apparatus Components

Figure 1:
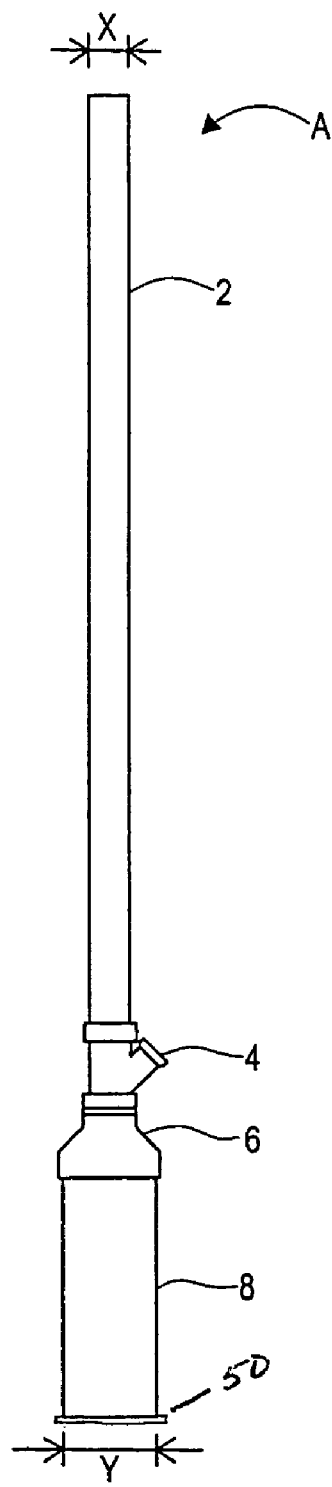
FIG. 1 is a side view of an exemplary plant-growing apparatus of the present invention.

FIG. 1 depicts an exemplary apparatus A for growing, watering, and stabilizing fruit or vegetable plants of the present invention. Apparatus A comprises the following elements: feeder conduit 2, fitting 4, coupling 6, and planting conduit 8. These elements may be manufactured from any material that may be shaped into a conduit configuration. In the preferred embodiment of the present invention, these elements are constructed from polyvinyl chloride (PVC) or a similar polymeric material. Feeder conduit 2 is used both as a means to route water directly to plant roots, as well as, to stabilize a plant growing within the apparatus by providing a vertical surface to which a plant grower may secure a plant 21 (see FIG. 2). Feeder conduit 2 may be any length suitable for allowing a grower to water the plant without bending over and for supporting the plant 21 at its maximum growth height. Likewise, feeder conduit 2 may have any cross-sectional shape and diameter x. In one desired embodiment, the feeder conduit has a length of up to about six feet, more desirably, from about three to about six feet, and a conduit diameter of up to about six inches, more preferably, from about one inch to about three inches. In one desired embodiment, the feeder conduit has a length of about four feet, a conduit diameter of about 1.5 inches, and a circular conduit cross-sectional configuration.

Fitting 4 is used to connect the feeder conduit 2 to the rest of the apparatus while providing an opening in the apparatus through which a plant may grow. The openings of fitting 4 are sized and shaped to connect to openings of feeder conduit 2 and coupling 6. Fitting 4 may have multiple openings for multiple plants if the size of planting conduit 8 is of sufficient size to accommodate multiple plants. In one exemplary embodiment, fitting 4 is a "y" shaped fitting with three openings, two of which are opposed, with circular cross-sections of about 1.5 inches in diameter. In an alternate embodiment of the present invention, feeder conduit 2 is connected directly to coupling 6 without utilizing fitting 4. If connecting feeder conduit 2 is directly connected to coupling 6, one or more openings are present in a side wall of couple 6 or in a side wall of feeder conduit 2, proximate to the junction of the two elements. These described openings, provided through various embodiments of the present invention, either in the side wall of coupling 6, feeder conduit 2, or preferably through the use of fitting 4, are desirably proximate to the junction of planting conduit 8 with the rest of the apparatus and allow a plant to exit planting conduit 8 exposing the plant to the open environment.

In one embodiment of the present invention, fitting 4 is attached directly to planting conduit 8. In order to decrease the size of the apparatus while maintaining sufficient diameter y of planting conduit 8 to support the roots of a fruit or vegetable plant, one exemplary embodiment of the present invention utilizes coupling 6 to connect feeder conduit 2 and fitting 4 to planting conduit 8. In doing so, coupling 6 allows feeder conduit 2 and fitting 4 to have smaller diameter openings compared to planting conduit 8. As seen in FIG. 1, coupling 6 has one opening with a similar cross-sectional shape and diameter as fitting 4 and an opposed opening with a similar cross-sectional shape and diameter as planting conduit 8. In one exemplary embodiment of the present invention, coupling 6 is a 1.5×3 inch coupling. Alternatively, fitting 4 may have one opening with a similar cross-sectional shape and diameter as planting conduit 8 and an opposed opening with a similar cross-sectional shape and diameter as feeder conduit 2 such that coupling 6 is not necessary.

Figure 5:
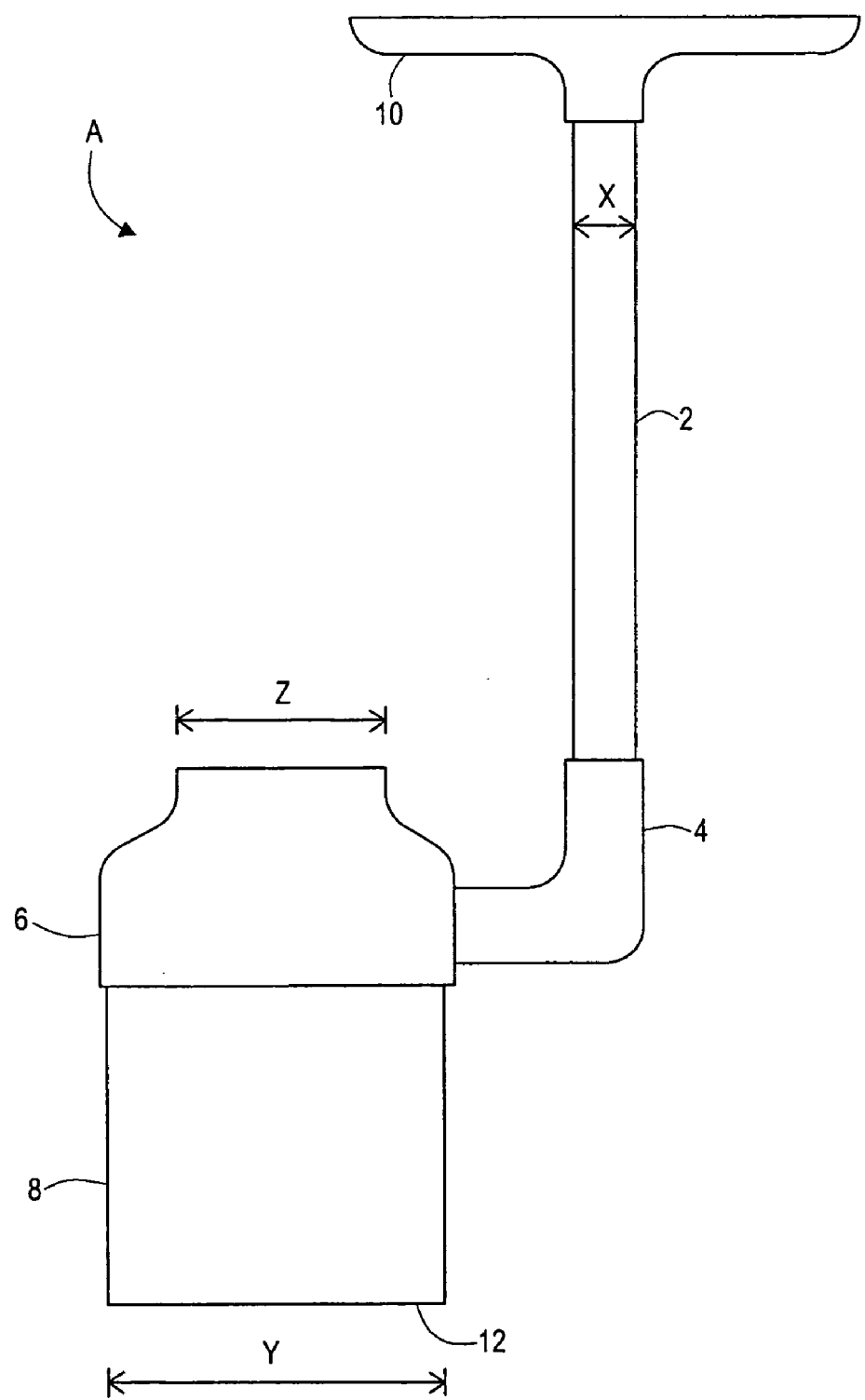
FIG. 5 is a side view of another exemplary plant-growing apparatus of the present invention.

In other embodiments of the present invention, fitting 4 may be an "L" shape fitting, which attaches directly into a side surface of planting conduit 8 or coupling 6. One exemplary apparatus of this embodiment is shown in FIG. 5. In this embodiment, feeder conduit 2 connects to "L" shape fitting 4, which is attached directly into a side surface of coupling 6. As shown in FIG. 5, fitting 4 has a first diameter x, planting conduit 8 has a second diameter y at lower end 12 of planting conduit 8, and coupling 6 has an opening diameter z. Although x, y and z may vary independently and relative to one another, typically, x is smaller than or equal to z, while z is smaller than or equal to y. Desirably, diameter x ranges from about 0.5 to about 4.0 inches, diameter z ranges from about 0.5 to about 6.0 inches, and diameter y ranges from about 3.0 to about 12.0 inches. As discussed above, in other embodiments, "L" shape fitting 4 may attach directly into planting conduit 8 (not shown).

Planting conduit 8 is used to accommodate the roots of a fruit or vegetable plant along with soil or any other appropriate growing medium. Planting conduit 8 may have any cross-sectional shape and diameter y and may be any length sufficient to encompass the roots of a healthy fruit or vegetable plant. In one exemplary embodiment of the present invention, planting conduit 8 has a length up to about 24.0 inches, desirably, from about 6.0 to about 18.0 inches, and a diameter of up to about 24.0 inches, desirably, from about 3.0 to about 12.0 inches. A cap, screen, or any other means for temporarily or permanently closing the end of planting conduit 8 opposite to coupling 6 may be used (i) to keep contents within the planting conduit 8 during storage or during moving of the apparatus, and (ii) to keep unwanted materials or objects, such as insects, from entering the apparatus.

The elements of the present invention discussed above may be connected together to form the completed apparatus using any means available. In one exemplary embodiment of the present invention, the openings of each component are threaded such that an opening with male threads is mated to an opening with female threads. If adjacent openings to be mated have like threads (i.e. male to male or female to female), an adaptor with an opposite thread configuration may be used. Any other connector or mechanical component may be used to attach components of the present apparatus to one another. Suitable connectors or mechanical components include, but are not limited to, surface friction (e.g., components are sized so as to snugly fit together), adhesives, external clamp (e.g., a member that may join abutting components to one another, wherein the clamping member straddles the joint between the abutting components), and screws.

The planting apparatus of the present invention may possess one or more of the following elements and/or characteristics:

(1) one or more connectors or mechanical components for coaxially connecting the feeder conduit to the planting conduit;

(2) an apparatus, wherein the planting conduit has a conduit diameter and the feeder conduit has a conduit diameter, and wherein the planting conduit diameter is at least as large as the feeder conduit diameter;

(3) an apparatus, wherein the connection means for coaxially connecting the feeder conduit to the planting conduit comprises a coupling having
   (i) a first opening diameter substantially equal to the feeder conduit diameter; and
   (ii) a second opening diameter substantially equal to the planter conduit diameter;

(4) an apparatus, wherein the feeder conduit and the planting conduit comprise a single, continuous material;

(5) an apparatus, wherein at least one opening in the apparatus is provided by a "y" shaped fitting coaxially connected using threads between a feeder conduit and a coupling;

(6) one or more plant connectors (see plant connector 22 in FIG. 2) for attaching one or more portions of a plant to the feeder conduit including, but not limited to, wire, string, and attachable rings for attaching to the feeder conduit;

(7) a cap, screen, or any other means for temporarily (see removable cover 50 in FIGS. 1–2) or permanently (see closed end 12 in FIG. 5) closing an end of a planting conduit opposite the feeding conduit;

(8) a foot mount (see foot mount 35 in FIG. 3) for assisting a grower when (i) forcing the planting conduit into the ground (i.e., similar to the way a shovel is forced into the ground), (ii) removing the apparatus from the ground, and/or (iii) grasping the apparatus when moving the apparatus from one location to another location;

(9) a bowl or funnel-shaped member (see bowl or funnel-shaped member 10 in FIG. 5) attachable to an upper opening of the feeder conduit to collect rain water;

(10) a decorative design on an outer surface of any component of the apparatus, such as a printed image or a painted image on (i) at least a portion of the planting conduit above ground, (ii) at least a portion of the coupling, when present, (iii) at least a portion of the feeder conduit, (ix) at least a portion of the fitting, when present, and/or (v) at least a portion of the bowl or funnel-shaped member, when present; and

(11) an apparatus, wherein the planting conduit comprises a planting container (i.e., an apparatus wherein the lower end of the planting conduit (such as lower end 12 shown in FIG. 5) is closed).

Figure 3:
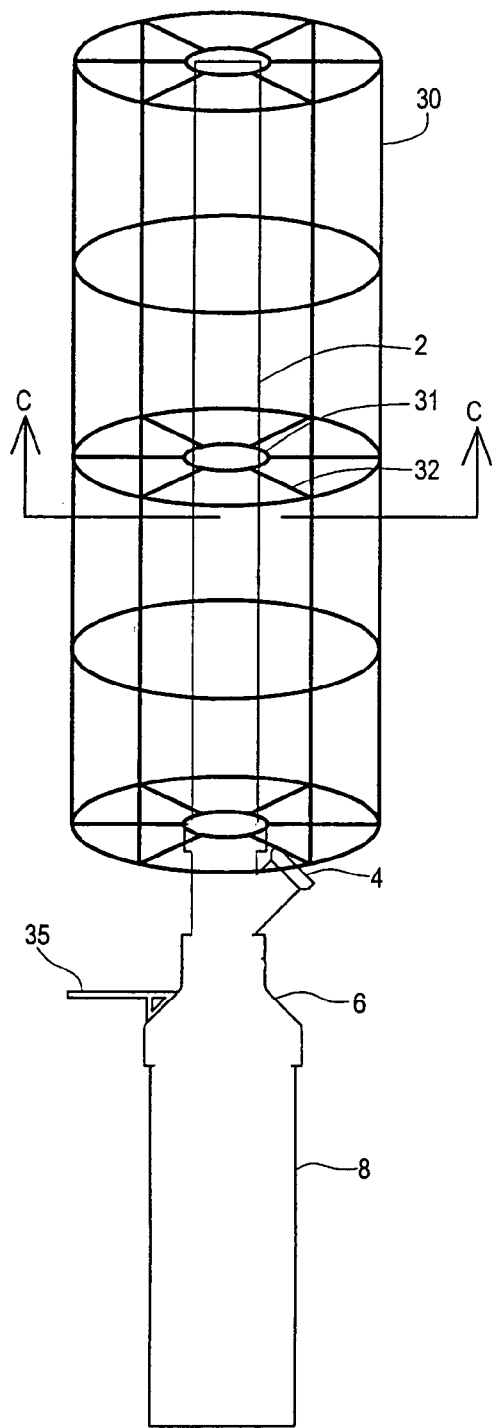
FIG. 3 is a side view of another exemplary plant-growing apparatus of the present invention.

In a further exemplary embodiment of the present invention, the planting apparatus A comprises a number of components as shown in FIG. 3. In this embodiment, apparatus A is a continuous apparatus (i.e., one continuous piece) comprises feeder conduit 2, fitting section 4, coupling section 6, planting conduit 8, foot mount 35, mesh 30, feeder conduit rings 31, and mesh braces 32 extending from feeder conduit rings 31 to mesh 30.

In this embodiment, mesh 30 adds additional support for a plant (not shown) growing in planting conduit 8. Mesh 30 may rest on the ground or a portion of mesh 30 may be forced into the ground for added stability.

Figure 4:
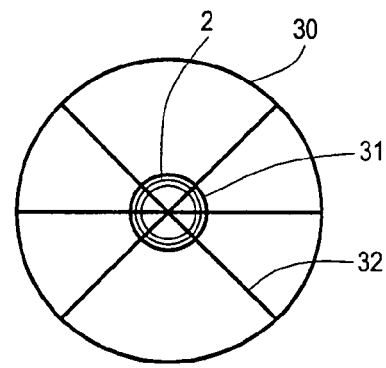
FIG. 4 is a cross-sectional view of the exemplary plant-growing apparatus shown in FIG. 3 along line C—C.

FIG. 4 provides a cross-sectional view of the apparatus shown in FIG. 3 along line C—C. As shown in FIG. 4, feeder conduit rings 31 have a diameter slightly larger than the outer diameter of feeder conduit 2 to provide stability of mesh 30 in combination with apparatus A. Mesh braces 32 provide additional stability. It should be understood that mesh 30 may have any number of feeder conduit rings 31 and mesh braces 32 as desired. Further, mesh 30 may have an outer cross-sectional configuration other than a circular cross-sectional configuration as shown in FIG. 4. Suitable outer cross-sectional configurations for mesh 30 include, but are not limited to, circular, rectangular, square, diamond, rhombus, etc.

B. Apparatus Materials

Each component of the apparatus of the present invention may comprise one or more materials. Suitable materials used to form individual components of the apparatus include, but are not limited to, wood, plastic, ceramic, metal, glass, polymeric material, polyvinyl chloride, and polyolefin. Desirably, the feeder conduit 2, planting conduit 8, coupling 6 (when present), and fitting 4 (when present) each independently comprise a polymeric material such as PVC. Desirably, foot mount 35, mesh 30, feeder conduit rings 31, and mesh braces 32 each independently comprise a metallic material, a polymeric material, or a combination thereof, such as a polymer coated metallic material to rust protection.

II. Method of Growing a Plant Using the Apparatus

The present invention is also directed to a method for growing, watering, and stabilizing a plant, such as a fruit or vegetable. In one exemplary embodiment, a grower places planting conduit 8 below ground level and fills it with soil, compost, or any other appropriate growing medium. The grower may bury roots of a plant in planting conduit 8 and connect couple 6 to planting conduit 8. This connection, as well as all others used in this method, may be made using any connection means available. Desired means for connecting elements together is by screwing threaded elements together. Coupling 6 may be packed with soil after connection to planting conduit 8. The grower connects fitting 4 to the coupling 6, threading the plant through a side opening in the fitting (see FIG. 2). The fitting may be packed with soil. In one exemplary embodiment, the grower uses a y-shaped fitting for planting a single fruit or vegetable plant within the apparatus.

Figure 2:
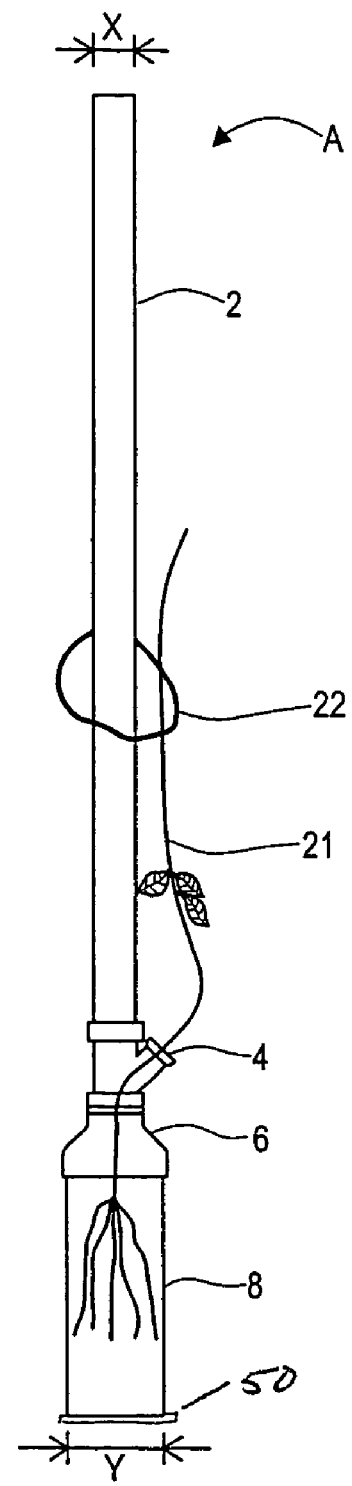
FIG. 2 is an illustrative side view of an exemplary planting system of the present invention.

The grower connects feeder conduit 2 to an opening of fitting 4 that is opposite the opening in fitting 4 to which couple 6 is attached. It may be necessary to add more soil down the feeder conduit to ensure adequate root coverage since soil will be compacted once watering begins. The grower feeds the plant as necessary by pouring the requisite amount of water or feeding solution into feeder conduit 2. As seen in FIG. 2, the grower stabilizes the plant as it grows by securing a portion of the plant to the feeder conduit 2.

In a further exemplary embodiment of the present invention, the method of growing a plant comprises positioning a plant into a completely assembled apparatus as described above and shown in FIGS. 1–2, wherein a first portion of the plant is within the planting conduit, and a second portion of the plant extends from the at least one opening of the apparatus.

In yet a further exemplary embodiment of the present invention, the method of growing a plant comprises (a) placing a seed or a portion of a planting in a planting conduit; (b) providing food to the seed or the planting via a feeding conduit integrally attached to the planting conduit; and (c) allowing a plant to extend from an opening proximate to a junction between the planting conduit and the feeding conduit. The method may further comprise (d) providing a growing medium in the planting conduit, wherein the growing medium comprises soil, water, nitrogen-containing plant food, sand, or a combination thereof; and (e) when the plant extends through the opening, attaching a portion of the plant to the feeder conduit to stabilize the plant.

III. Plant Growing System

The present invention is also directed to a plant growing system. The plant growing system may comprise any of the above-mentioned apparatus components. The plant growing system may further comprise one or more materials in the planting conduit. Suitable materials for use in the planting conduit include, but are not limited to, soil, plant food, water, a plant seed, a portion of a plant, or a combination thereof. In one desired embodiment, the plant growing system comprises a seed or portion of a plant, such as plant roots, in the planting conduit of the apparatus.

In one exemplary embodiment of the present invention, the planting system comprises: (a) an apparatus for growing a plant, wherein the apparatus comprises (i) a feeder conduit, (ii) a planting conduit integrally connected to the feeder conduit, and (iii) an opening proximate a junction between the feeder conduit and the planting conduit; and (b) a seed or plant portion positioned within the planting conduit. The planting system may further comprise a removable cover, wherein the removable cover prevents one or more materials from exiting an end of the planting conduit opposite from the feeder conduit. In one embodiment, the planting system may comprise a planting conduit, wherein the planting conduit is in the form of a container (i.e., the planting conduit has a permanent cover or is a closed container other than a possible opening proximate a junction between the planting conduit and feeder conduit as described above).

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

I claim:

1. An apparatus for growing, watering, and stabilizing fruit or vegetable plants comprising:
   a feeder conduit having a feeder conduit diameter, an upper feeder conduit end with a feeder conduit opening therein, and a lower feeder conduit end;
   a planting conduit connected to the feeder conduit at the lower feeder conduit end, wherein the planting conduit has a planting conduit diameter; and
   at least one unobstructed opening in the apparatus proximately located at the junction of the feeder conduit and the planting conduit, wherein the at least one unobstructed opening provides a pathway for at least one plant to grow within the planting conduit and extend through the at least one unobstructed opening.

2. The apparatus of claim 1, further comprising a mechanical connector for coaxially connecting the lower feeder conduit end of the feeder conduit to the planting conduit.

3. The apparatus of claim 2, wherein the mechanical connector for coaxially connecting the feeder conduit to the planting conduit comprises a coupling having (i) a first opening diameter substantially equal to the feeder conduit diameter; and
(ii) a second opening diameter substantially equal to the planter conduit diameter.

4. The apparatus of claim 3, wherein the at least one unobstructed opening in the apparatus is provided by a "y" shaped fitting positioned between the feeder conduit and the coupling.

5. The apparatus of claim 1 wherein the feeder conduit is from about 4 to about 6 feet in length, and the upper feeder conduit end extends a vertical distance above the planting conduit.

6. The apparatus of claim 1, wherein the planting conduit diameter is at least as large as the feeder conduit diameter.

7. The apparatus of claim 1, wherein the feeder conduit and the planting conduit each independently comprise one or more materials selected from the group consisting of wood, plastic, ceramic, metal, glass, polymers, polyvinyl chloride, and polyolefin.

8. The apparatus of claim 1, further comprising one or more materials in the planting conduit, wherein the one or more materials comprise soil, plant food, water, a plant seed, a portion of a plant, or a combination thereof.

9. The apparatus of claim 8, wherein the apparatus further comprises a plant.

10. The apparatus of claim 1, further comprising one or more plant connectors for attaching one or more portions of a plant to the feeder conduit.

11. The apparatus of claim 1, wherein the planting conduit has an upper planting conduit end and a lower planting conduit end opposite the upper planting conduit end, wherein the lower planting conduit end is closed.

12. The apparatus of claim 1, wherein the planting conduit comprises a planting container.

13. A method of growing a plant comprising:
   positioning a plant into the apparatus of claim 1, wherein a first portion of the plant is within the planting conduit, and a second portion of the plant extends from the at least one unobstructed opening.

14. The apparatus of claim 1, further comprising a bowl connected to the upper feeder conduit end of the feeder conduit, wherein the bowl has a bowl opening therein that is in fluid communication with the feeder conduit opening, said bowl being capable of receiving water, rain water, or both.

15. A planting system comprising:
   (a) an apparatus for growing a plant comprising:
      (i) a feeder conduit having a feeder conduit diameter, an upper feeder conduit end with a feeder conduit opening therein, and a lower feeder conduit end;
      (ii) a planting conduit integrally connected to the feeder conduit at the lower feeder conduit end, wherein the planting conduit has a planting conduit diameter; and
      (iii) an unobstructed opening proximate a junction between the feeder conduit and the planting conduit, wherein the at least one unobstructed opening provides a pathway for at least one plant to grow within the planting conduit and extend through the at least one unobstructed opening; and
   (b) a seed or plant portion positioned within the planting conduit.

16. The planting system of claim 15, further comprising a removable cover, wherein the removable cover prevents one or more materials from exiting an end of the planting conduit opposite the feeder conduit.

17. The planting system of claim 15, wherein the planting conduit comprises a container.

18. An apparatus for growing, watering, and stabilizing fruit or vegetable plants comprising:
   a feeder conduit having a feeder conduit diameter, an upper feeder conduit end with a feeder conduit opening therein, and a lower feeder conduit end;
   a planting conduit connected to the feeder conduit at the lower feeder conduit end, wherein the planting conduit has a planting conduit diameter;
   a coupling for coaxially connecting the lower feeder conduit end of the feeder conduit to the planting conduit, the coupling having (i) a first opening diameter substantially equal to the feeder conduit diameter, and (ii) a second opening diameter substantially equal to the planter conduit diameter; and
   a "y" shaped fitting connecting the feeder conduit and the coupling, wherein the "y" shaped fitting provides an unobstructed opening in the apparatus proximately located at the junction of the feeder conduit and the planting conduit, wherein the at least one unobstructed opening provides a pathway for at least one plant to grow within the planting conduit and extend through the at least one unobstructed opening.

19. An apparatus for growing, watering, and stabilizing fruit or vegetable plants comprising:
   a feeder conduit section having a feeder conduit section diameter, an upper feeder conduit section end with a feeder conduit opening therein, and a lower feeder conduit section end;
   a planting conduit section integrally connected to the feeder conduit section at the lower feeder conduit end, wherein the planting conduit section has a planting conduit section diameter; and
   at least one unobstructed opening in the apparatus proximately located at the junction of the feeder conduit section and the planting conduit section, wherein the at least one unobstructed opening provides a pathway for at least one plant to grow within the planting conduit section and extend through the at least one unobstructed opening; and wherein the feeder conduit section and the planting conduit section comprise a single, continuous material.

20. The apparatus of claim 19, further comprising a bowl connected to the upper feeder conduit end of the feeder conduit section, wherein the bowl has a bowl opening therein that is in fluid communication with the feeder conduit opening, said bowl being capable of receiving water, rain water, or both.

* * * * *